United States Patent [19]

Nishimura

[11] Patent Number: 4,588,144

[45] Date of Patent: May 13, 1986

[54] WEBBING RETRACTOR

[75] Inventor: Yuji Nishimura, Aichi, Japan

[73] Assignee: Kabushiki Kaisha Tokai-rika-denki-seisakusho, Aichi, Japan

[21] Appl. No.: 650,349

[22] Filed: Sep. 13, 1984

[30] Foreign Application Priority Data

Sep. 13, 1983 [JP] Japan .......................... 58-141885[U]

[51] Int. Cl.[4] ........................ B60R 22/44; B65H 75/48
[52] U.S. Cl. .................................... 242/107; 280/807
[58] Field of Search ......... 242/107, 107.4 R, 107.4 E; 280/806, 807; 297/475–478

[56] References Cited

U.S. PATENT DOCUMENTS

4,002,219 1/1977 Steinmann ...................... 242/107 X
4,487,381 12/1984 Kubota ................................ 242/107

Primary Examiner—John M. Jillions
Attorney, Agent, or Firm—Sixbey, Friedman & Leedom

[57] ABSTRACT

In a webbing retractor retracting an occupant restraining webbing therein, one end portion of resilient means giving a webbing retracting force to a webbing takeup shaft retracting the webbing thereon is driven by drive means, so that the retracting force of the takeup shaft is made changeable, and the drive of the drive means is controlled by a control device in accordance with detected signals from position detecting switch means for detecting a drive position of the end portion of the resilient means and from direction detecting switch means for detecting a drive direction thereof. Accordingly, not only the drive position but also the drive direction are reliably detected by the detecting switches, so that the webbing retracting force of the takeup shaft can be reduced securely.

17 Claims, 8 Drawing Figures

WEBBING RETRACTOR

BACKGROUND OF THE INVENTION

1. Field of the Invention

The present invention relates to a webbing retractor adapted for use in a seatbelt system for a vehicle to retract an occupant restraining webbing therein.

2. Description of the Prior Art

In prior art seatbelt systems, the occupant is restrained by the webbing and the webbing is retracted at one end portion thereof into the webbing retractor.

The webbing retractor is constructed in such a manner that an intermediate portion of the webbing is drawn closely against the occupant by a webbing retracting force while the occupant is being restrained by the webbing. This webbing retractive force serves to retract and store the webbing after the webbing is released from its restraining position over the occupant.

Accordingly, the occupant restrained by the webbing feels a sense of oppression due to the webbing retracting force. In order to remove this sense of oppression from the occupant there have been proposed various means. In such means, however, the constructions thereof are complicated, or the webbing retracting forces cannot be reduced to proper values.

SUMMARY OF THE INVENTION

In view of the above facts, the present invention has as its object the provision of a simply constructed webbing retractor which does not produce a sense of oppression to an occupant.

A webbing retractor according to the present invention is constructed such that one end portion of resilient means imparting a webbing retracting force to a webbing takeup shaft is connected to a driving means and is driven thereby, so that the webbing retracting force of the takeup shaft is capable of being changed. In addition, the webbing retractor is provided with a position detecting switch for detecting the drive position of the one end portion of the resilient means driven by the driving means, a direction detecting switch for detecting the drive direction of the one end portion of the resilient means, and a control means for controlling the drive means in response to signals outputted to the control means from the position detecting switch and the direction detecting switch, whereby the webbing retracting force of the takeup shaft can be reduced so that any sense of oppression to an occupant can be prevented.

Description will hereinunder be given of an embodiment according to the present invention with reference to the drawings attached hereto.

PREFERRED EMBODIMENT OF THE INVENTION

Figure 1:
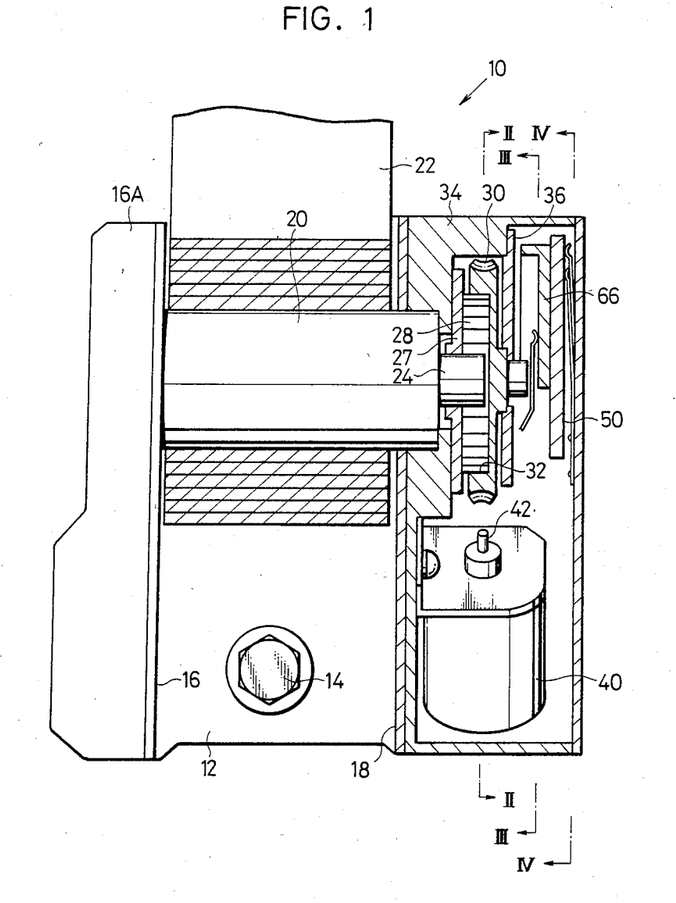
FIG. 1 is a front sectional view showing an embodiment according to the present invention.
Figure 2:
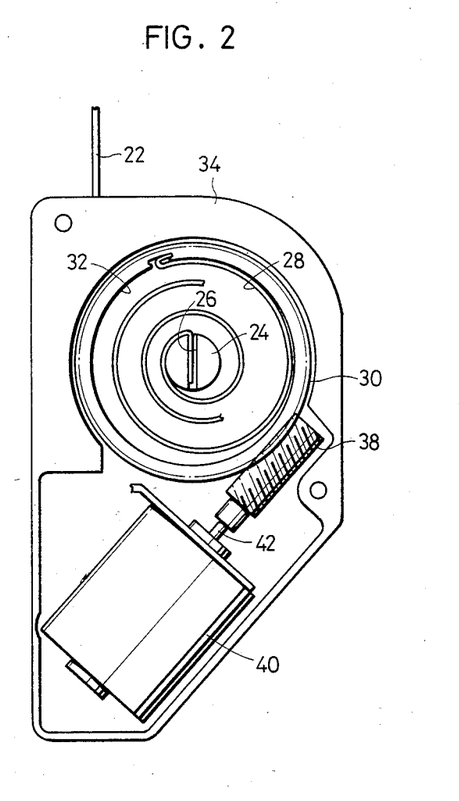
FIG. 2 is a sectional view along a line II—II of FIG. 1.
Figure 6:
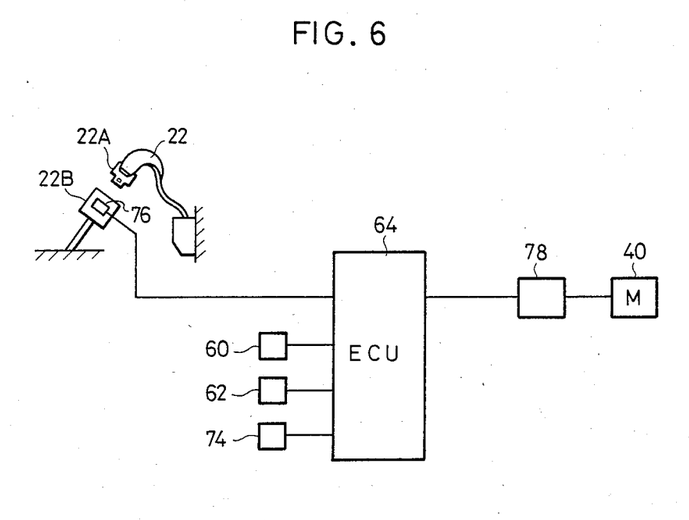
FIG. 6 is a circuit diagram of control means of the embodiment.

In FIG. 1, a webbing retractor 10 according to the present invention is illustrated which includes a frame 12 fixed to a vehicle body (not shown) through a mounting bolt 14. The frame 12 is formed at both side portions thereof with a pair of leg plates 16 and 18 bent at a substantially right angle from both side portions and in parallel with each other, and the leg plates 16 and 18 rotatably support a webbing takeup shaft 20 at portions thereof adjacent to both its end portions. On the takeup shaft 20 a first end portion of an occupant restraining webbing 22 is retracted in layers. The second end portion of the webbing 22 is secured thereto with a tongue plate 22A which is capable of being latched to a buckle device 22B as shown in FIG. 6, whereby an occupant of a vehicle can be restrained by an intermediate portion of the webbing 22.

A small diameter end portion 24 of the takeup shaft 20 extends through the leg plate 18. The small diameter portion 24 includes a slit 26 at its front end in which an inner end portion of a spiral spring 28, the biasing means, is received, an outer end portion thereof being secured to an inner periphery of a recess portion 32 formed on a worm wheel 30. The worm wheel 30 is rotatably disposed coaxially with the takeup shaft 20 through a housing 34 mounted on an outside of the leg plate 18 and a sheet 36 fixed to the housing 34. In this connection, disposed between the housing 34 and the spiral spring 28 is a spring sheet 27 for keeping the motion of the spiral spring 28 smooth.

The worm wheel 30 is engaged with a worm 38 which is fixed to an output shaft 42 of a motor 40, which is its driving means. Accordingly, when the output shaft 42 of the motor 40 is rotated, the worm 42 rotationally drives the outer end portion of the spiral spring 28 through the worm wheel 30, whereby the web-retractive biasing force of the spiral spring 28 is made strong or weak. Thus, the retracting force of the takeup shaft 20 acting upon the webbing 22 can be changed.

Figures 3, 4:
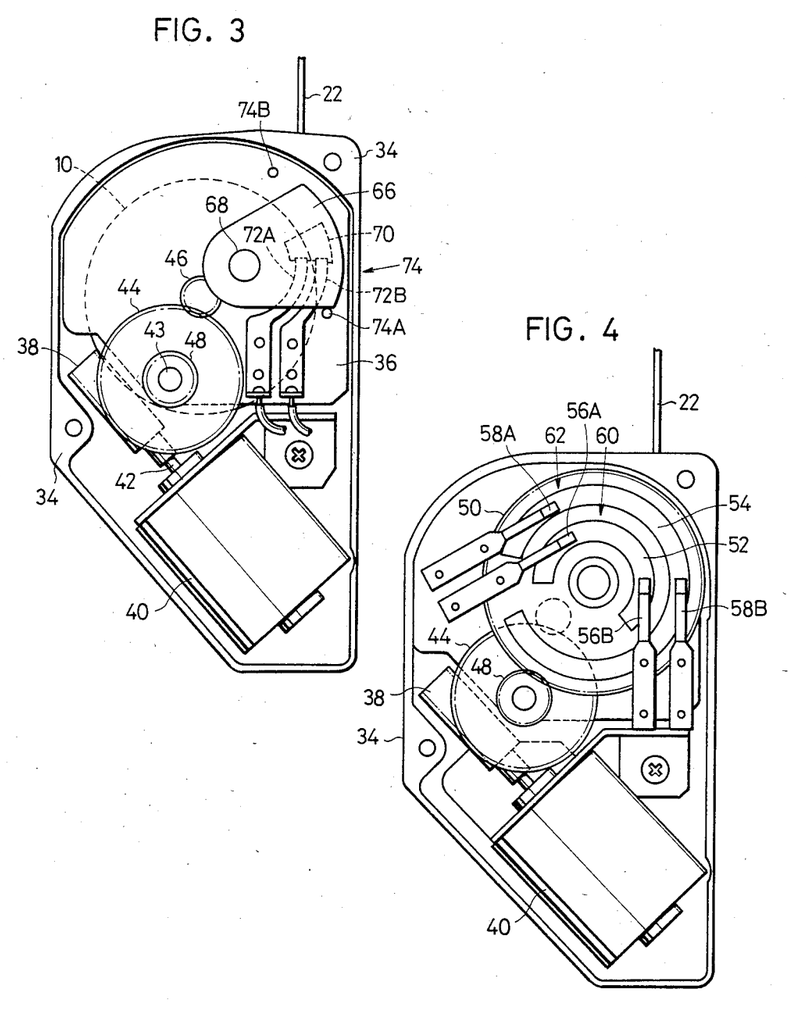
FIG. 3 is a sectional view taken along a line III—III of FIG. 1.
FIG. 4 is a sectional view taken along a line IV—IV of FIG. 1.
Figure 5:
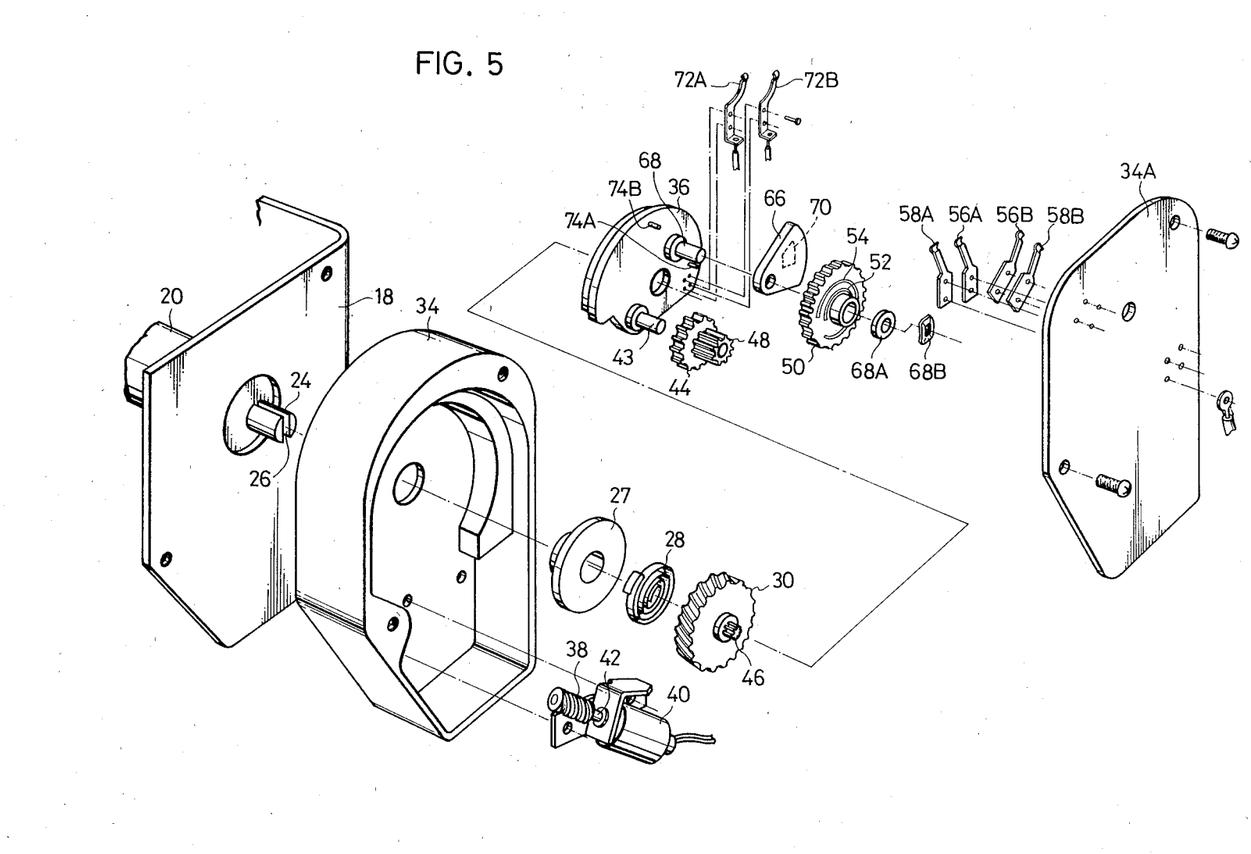
FIG. 5 is a disassembled perspective view of FIG. 1.

As shown in FIG. 3, supported rotatably on the sheet 36 through a pin 43 is a spur gear 44 which is engaged with a pinion 46 fixed to the worm wheel 30 coaxially therewith. The spur gear 44 is fixed with a pinion 48 coaxially therewith and the pinion 48 is engaged with a spur wheel 50, as shown in FIG. 4. Accordingly, the rotation of the worm wheel 30 is subjected to a considerable reduction before being transmitted to the spur wheel 50. As shown in FIGS. 4 and 5, the spur wheel 50 is attached to its one side face with two printed bases 52 and 54, which are movable contacts arcuately shaped coaxially about the axis of the spur wheel 50. The printed bases 52 and 54 are respectively opposed to a pair of fixed contacts 56A and 56B and a pair of fixed contacts 58A and 58B.

The combination of the printed base 52 and the fixed contacts 56A and 56B along with the combination of the printed base 54 and the fixed contacts 58A and 58B, constitute position detecting switches 60 and 62.

The position detecting switch 60 is constructed so that it is "on" when the spur wheel 50 is positioned in the position shown in FIG. 4. When the spur wheel 50 is rotated in a direction to weaken the biasing force of the spiral spring 28 (namely, in a counterclockwise direction on FIG. 4) by a predetermined amount, the position detecting switch 60 is switched "off". In this "off" position of the position detecting switch 60 (which corresponds to a "comfort situation") the tension of the webbing 22 is made very weak or it is cancelled completely, whereby any sense of oppression felt by the occupant is reduced greatly.

On the other hand, when the spur wheel 50 is rotated in a direction to strengthen the biasing force of the spiral spring 28 (i.e., in a clockwise direction on FIG. 4) so that the spiral spring 28 is given enough biasing force to retract almost all of the webbing 22, the position detecting switch 60 is switched "off".

The position detecting switch 62 is constructed so that it is "on" when the spur wheel 50 is positioned in the situation shown in FIG. 4. When the spur wheel 50 is rotated in a direction which strengthens the biasing force of the spiral spring 28 (i.e., in a clockwise direction on FIG. 4) by a predetermined amount, the drive position detecting switch 62 is switched "off". In this connection, before or when the position detecting switch 62 is switched "off", the position detecting switch 60 is switched "on".

Also, when the spur wheel 50 is rotated from the strengthened situation of the spiral spring 28 in such a direction as to weaken the biasing force of the spiral spring 28 (i.e., in a counterclockwise direction on FIG. 4), the position detecting switch 62 is switched from an "on" position to an "off" position. At that time, the webbing 22 has already been retracted on the takeup shaft 20 in a full retracted state and the biasing force of the spiral spring 28 is made strong enough to maintain the full retracted state of the webbing 22.

The position detecting switches 60 and 62 constituting the position detecting switch means are connected to a control device 64, as shown in FIG. 6, in order to supply detected signals thereto.

Disposed between the spur wheel 50 and the sheet 36 is a cam plate 66 which is rotatably supported on the sheet 36 through a pin 68 fixed projectingly on the sheet 36. The cam plate 66 includes on its face opposed to the sheet 36 a printed base 70, as well as a movable contact which is opposed to a pair of contacts 72A and 72B which are fixed contacts. The printed base 70 and the contacts 72A and 72B constitute a direction detecting switch 74.

The rotation angle of the cam plate 66 is restricted by stopper pins 74A and 74B provided projectingly with the sheet 36, and a rotation force of the spur wheel 50 is transmitted to the cam plate 66 through a frictional force occurring therebetween. Accordingly, while the spur wheel 50 is being rotated by the motor 40 in a direction which increases the biasing force of the spiral spring 28 (namely, in the clockwise direction on FIG. 4) the direction detecting switch is "on", but, while the spur wheel 50 is being rotated by the motor 40 in a direction decreasing the biasing force of the spiral spring 28, the printed base 70 is separated from the contacts 72A and 72B, so that the direction detecting switch 74 is "off". The cam plate 66 and the spur wheel 50 constitute a lost motion mechanism wherein the cam plate 66 at first rotates along with the spur wheel 50 due to the frictional force occurring therebetween during the initial stage of the rotation of the spur wheel 50, but thereafter stops such rotation after the cam plate 66 abuts on one of the stopper pins 74A and 74B, which causes the spur wheel 50 to move relative to the cam plate 66. Also, the direction detecting switch 74, as the direction detecting switch means, is connected to the control device 64 to supply detected signals thereto, as shown in FIG. 6.

Furthermore, as shown in FIG. 6, the buckle device 22B houses a buckle switch 76 therein, and in a latched situation of the tongue plate 22A to the buckle device 22B the buckle switch 76 is "on" and it supplies a detected signal to control device 64.

The control device 64 is described in detail below.

As shown in FIG. 6, the control device 64 is connected to the motor 40 through a driver 78, so that it controls the driver 78 to drive the motor 40. Thus, the motor 40 and the driver 78 constitute a drive means.

Figure 7:
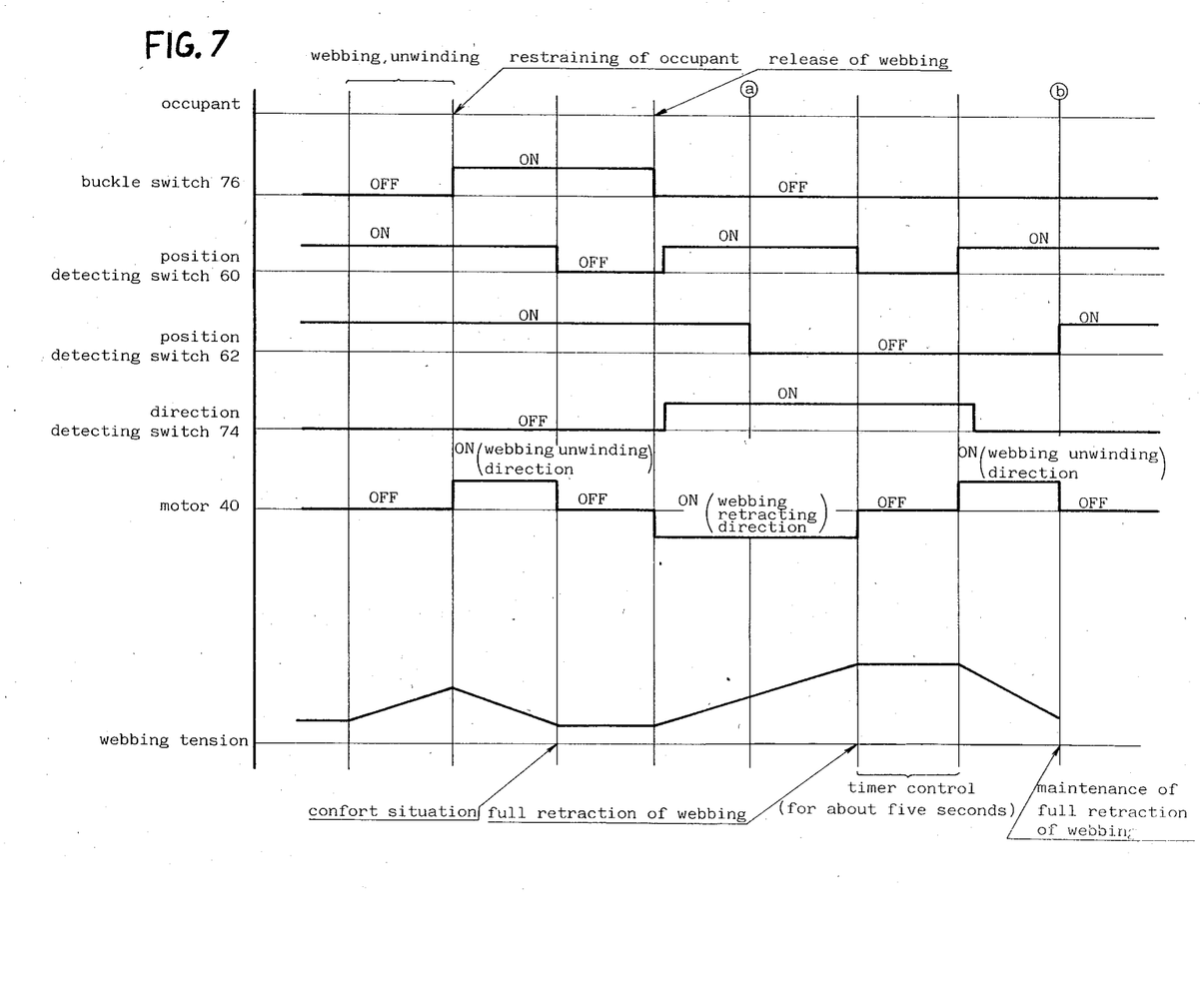
FIG. 7 is a timing chart of the embodiment.

As shown by a timing chart of FIG. 7, when the buckle switch 76 is "on", the control device 64 controls the driver 78 to rotate the motor 40 in a direction which decreases the biasing force of the spiral spring 28, i.e., in a webbing unwinding direction, and when the position detecting switch 60 is switched "off", in which the position detecting switch 62 is "on" and the direction detecting switch 74 is "off", the control device 64 controls the driver 78 to stop the rotation of the motor 40. Also, when the buckle switch 76 is switched "off", the control device 64 controls the driver 78 to rotate the motor 40 in a direction which increases the biasing force of the spiral spring, i.e., in a webbing retracting direction, and when the position detecting switch 60 is switched "off", in which the position detecting switch 60 is "off" and the direction detecting switch 74 is "on", the control device 64 controls the driver 78 to stop the rotation of the motor 40 and to maintain the spiral spring 28 in this increased biasing force position for five seconds or so through a timer housed in the control device 64. Thereafter, the control device 64 controls the driver 78 to rotate the motor 40 in the direction of the decrease of the biasing force of the spiral spring 28 so as to return it back to its initial position. When the position detecting switch 62 is switched "on" and the direction detecting switch 74 is switched "off", the control device 64 controls the driver 78 to stop the rotation of the motor 40.

The pin 68 rotatably supporting the spur wheel 50 is secured with a plate washer 68A and a spring washer 68B which secure the frictional force occurring between the spur wheel 50 and the cam plate 66 at the time of a rotation of the spur wheel 50. In addition, the housing 34 is secured with a cover 34A for concealing the mechanical structure of the embodiment. Disposed outside of the leg plate 16 is an inertial locking mechanism 16A constructed so as to stop a webbing unwinding rotation of the takeup shaft 20 in an emergency situation of the vehicle.

Figure 8:
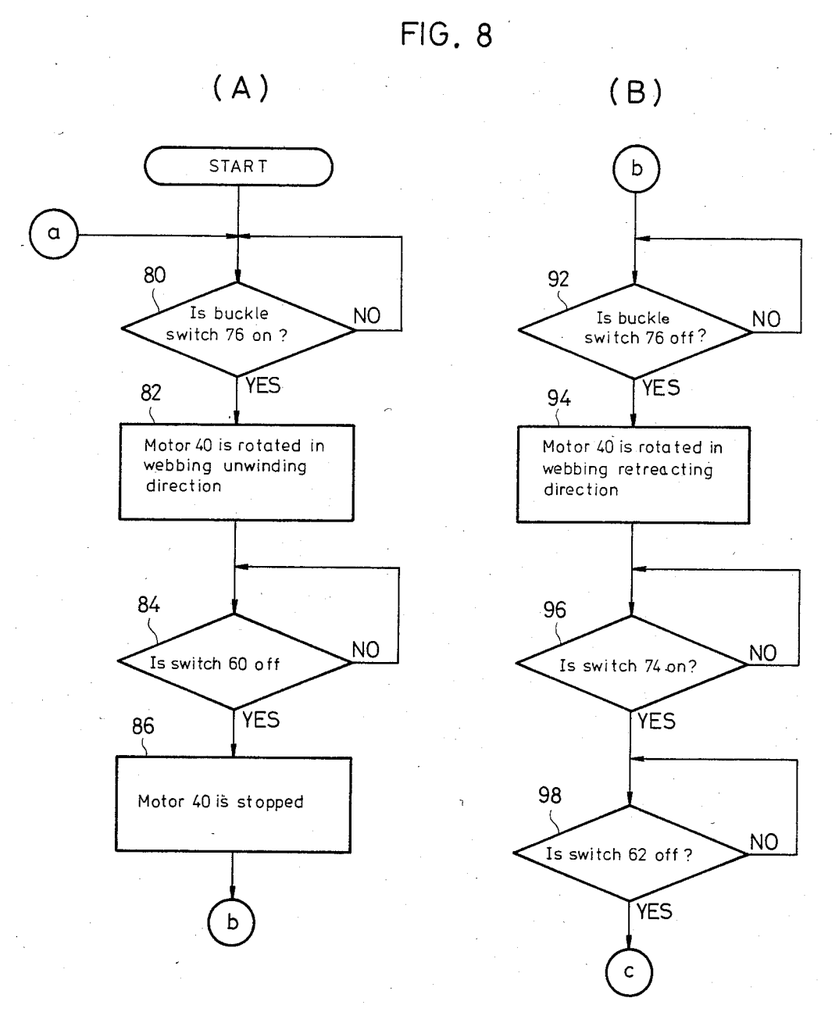
FIG. 8 is a flow chart showing the control steps of the embodiment.

Description will now be given of the operation of the embodiment thus constructed with reference to a flow chart of FIG. 8.

When the webbing 22 is unwound from the webbing retractor 10 and the tongue plate 22A is latched to the buckle device 22B after the occupant seats himself within the vehicle, the buckle switch 76 is switched "on" (step 80) and the control device 64 controls the driver 78 to rotate the motor 40 in the webbing unwinding direction, thereby to weaken the biasing force of the spiral spring 28 (step 82).

The spur wheel 50 is rotated in the counterclockwise direction on FIG. 4, so that the position detecting switch 60 is switched "off" (step 84), and the electric control unit (ECU) 64 controls the driver 78 to stop the motor 40 (step 86).

As a result, the biasing force of the spiral spring 28 acting upon the webbing 22 through the takeup shaft 22 is decreased, or can be removed, so that the occupant is put in a comfortably restrained situation by the webbing 22.

When the tongue plate 22A is released from the buckle device 22B in order to release the occupant from the restrained situation by the webbing 22, the buckle switch 76 is switched "off" (step 92), and the control unit 64 controls the driver 78 to rotate the motor 40 in the webbing retraction direction, thereby to strengthen the biasing force of the spiral spring 28 (step 94).

Accordingly, a retracting force of the takeup shaft is increased and the webbing 22 is rapidly retracted on the takeup shaft 22. While the webbing 22 is being retracted on the takeup shaft 22, the direction detecting switch 74 is switched "on" (step 96), the position detecting switch 62 is switched off (step 98), and the position detecting switch 60 is switched "on" and thereafter switched "off" (step 100). That is to say, when the direction detecting switch 74 is "on" and the position detecting switches 62 and 60 are respectively switched "off", the electric control unit 64 controls the driver 78 to stop the motor 40 (step 102), whereby the biasing force of the spiral spring 28 is increased and the webbing 22 is retracted on the takeup shaft 20 in the full retracted state.

The pause of the motor 40, i.e., the increased situation of the biasing force of the spiral spring 28, is maintained for five seconds by the timer housed in the electric control unit 64 (step 104), and thereafter the control unit 64 controls the driver 78 to rotate the motor 40 in the webbing unwinding direction, thereby to weaken the biasing force of the spiral spring 28 (step 106). When the position detecting switch 60 is "on" (step 108), the direction detecting switch 74 is "off" (step 110) and the position detecting switch 62 is switched "on" (step 112), the control unit 64 controls the driver 78 to stop the rotation of the motor 40 (step 114).

As set forth above, the rotation of the motor 40 is stopped for five seconds, which maintains the increased biasing force of the spiral spring 28 for five seconds, so that, even if the occupant grasps the webbing 22 for a while, the webbing 22 is securely retracted on the takeup shaft 20 up to the full retracted state when the webbing 22 is released from the occupant.

In addition, because direction detecting switch 74 detects the rotation direction of the spur wheel 50 reliably, problems which could occur as a result of the motor 40 being controlled by the control unit 64 in accordance with the detected signals of only the position detecting switches 60 and 62 are obviated. Specifically, in situations such as a and b of FIG. 7, where both the position detecting switches 60 and 62 are "on", it could not be determined whether or not the biasing force of the spiral spring 28 had been put in an increased state were it not for the direction detecting switch 74.

In this connection, the webbing retractor 10 can be constructed such that when the webbing 22 is unwound from the takeup shaft 20 by the occupant, the motor 40 is rotated to decrease the biasing force of the spiral spring 28.

What is claimed is:

1. A webbing retractor for retracting an occupant restraining webbing which is adapted for use in a seat-belt system for a vehicle, comprising:
   (a) a webbing takeup shaft for retracting one end portion of the webbing thereon;
   (b) a resilient means having first and second end portions wherein said resilient means is secured at said first end portion to the takeup shaft for biasing the takeup shaft in a direction of a webbing retraction;
   (c) a drive means connected to the second end portion of the resilient means for driving the second end portion of the resilient means in order to change the biasing force of the resilient means acting upon the takeup shaft;
   (d) position detecting switch means for detecting the position of the second end portion of the resilient means driven by the drive means;
   (e) a direction detecting switch means for detecting the direction that the second end portion of the resilient means is driven by the drive means which is switched on and off through a lost motion mechanism when said second end portion of the resilient means is initially driven; and
   (f) a control means for controlling the drive means in response to detected signals outputted from the position detecting switch means and from the direction detecting switch means,
   whereby a sense of oppression felt by the occupant restrained by the webbing can be prevented.

2. A webbing retractor as set forth in claim 1, wherein the drive means is connected to the second end portion of the resilient means through a worm gear fixed to an output shaft of the drive means and a worm wheel disposed coaxially with the takeup shaft and rotatably movable relative thereto, whereby the driving force of the drive means is subjected to reduction before being transmitted to the second end portion of the resilient means.

3. A webbing retractor as set forth in claim 2, wherein the worm wheel is formed with a recess portion and the second end portion of the resilient means is secured to an inner peripheral portion of the recess portion.

4. A webbing retractor as set forth in claim 3, wherein the lost motion mechanism includes a spur wheel rotated in accordance with a rotation of the worm wheel, a cam plate which contacts the spur wheel and which rotate can rotate together therewith, and a pair of pins disposed at both sides of the cam plate for stopping the rotation of the cam plate, whereby the cam plate rotates along with the spur wheel in an initial stage of the rotation of the spur wheel, but does not rotate with the cam plate when stopped by one of the pins.

5. A webbing retractor as set forth in claim 4, wherein the direction detecting switch means includes a movable contact which is attached to the cam plate and is movable together therewith, and a pair of fixed contacts opposed to the movable contact and connected to the control means, the direction detecting switch means being switched on when the cam plate is rotated in one direction and the direction detecting switch means being switched off when the cam plate is rotated in the other direction, whereby the drive direction of the second end portion of the resilient means is detected by the control means.

6. A webbing retractor as set forth in claim 5, wherein the position detecting switch means comprises a pair of switches including an arc-shaped movable contact attached on the spur wheel and a pair of fixed contacts connected to the control unit, one of the switches being switched off when the spur wheel is rotated in one direction by a predetermined amount and being switched on when the spur wheel is rotated in the other direction by a predetermined amount, and the other thereof being switched off when the spur wheel is rotated in the other direction by a predetermined amount and being switched on when the spur wheel is rotated in the one direction by a predetermined amount, whereby the drive position of the other end portion of the resilient means is detected by the control means.

7. A webbing retractor as set forth in claim 6, wherein the drive means includes a driver having a motor which rotates the driver in response to detected signals outputted from the control means.

8. A webbing retractor as set forth in claim 7, wherein the worm wheel is connected to the spur wheel through reduction gearing, whereby any rotation of the worm wheel is subjected to reduction before being transmitted to the spur wheel.

9. A webbing retractor as set forth in claim 8, wherein the spur wheel is biased in a direction of the cam plate by a spring washer, whereby the contact between the spur wheel and the cam plate is maintained.

10. A webbing retractor for retracting an occupant restraining webbing which is adapted for use in a seatbelt system for a vehicle, which comprises:
  (a) a webbing takeup shaft rotatably supported on a frame mounted on a vehicle body for retracting one end portion of the webbing thereon;
  (b) a spiral spring secured at its inner end portion to the takeup shaft for biasing the takeup shaft in a direction of a webbing retraction;
  (c) a motor connected to an outer end portion of the spiral spring for rotating the outer end portion of the spiral spring to change the biasing force of the spiral spring acting upon the takeup shaft;
  (d) a pair of position detecting switches for detecting the position of the outer end portion of the spiral spring rotated by the motor;
  (e) a direction detecting switch for detecting the direction of the outer end portion of the spiral spring rotated by the motor which is switched on or off through a lost motion mechanism during the initial rotation of the outer end portion of the spiral spring by said motor; and
  (f) an electric control unit for controlling the motor in response to detected signals outputted from the position detecting switches and from the direction detecting switch,
  whereby a sense of oppression felt by the occupant restrained by the webbing can be prevented.

11. A webbing retractor as set forth in claim 10, wherein the motor is connected to the outer end portion of the spiral spring through a worm gear fixed to an output shaft of the motor and a worm wheel disposed coaxially with the takeup shaft and rotatably movable relative thereto, whereby the rotation of the motor is subjected to reduction before being transmitted to the outer end portion of the spiral spring.

12. A webbing retractor as set forth in claim 11, wherein the worm wheel is formed with a circular recess portion coaxial to the rotational axis of the worm wheel, the spiral spring being received partially in the recess portion and the outer end portion thereof being secured at the periphery of the recess portion, whereby the outer end portion of the spiral spring is rotated in a direction of increase or decrease of the biasing force of the spiral spring in accordance with the rotation of the worm wheel.

13. A webbing retractor as set forth in claim 12, wherein the lost motion mechanism includes a spur wheel rotatably supported on a sheet supported by a frame which rotates along with the worm wheel, a cam plate rotatably supported on the sheet coaxially with the spur wheel which is biased into contact with the spur wheel so that it rotates therewith, and a pair of pins formed on the sheet and positioned at both sides of the cam plate for arresting the rotation of the cam plate, whereby the cam plate rotates along with the spur wheel in an initial stage of the rotation of the spur wheel, and thereafter the rotation of the cam plate is stopped by one of the pins.

14. A webbing retractor as set forth in claim 13, wherein the direction detecting switch includes a movable contact attached to the cam plate which is movable together therewith and a pair of fixed contacts opposed to the movable contact and connected to the electric control unit, the direction detecting switch being switched on when the cam plate is rotated in a direction which increases the biasing force of the spiral spring, and being switched off when the cam plate is rotated in a direction which decreases the biasing force of the spiral spring, whereby the rotational direction of the outer end portion of the spiral spring is detected by the electric control unit.

15. A webbing retractor as set forth in claim 14, including two direction detecting switches, wherein each of the position detecting switches includes an arc-shaped movable contact attached on the spur wheel and a pair of fixed contacts opposed to the arc-shaped movable contact and connected to the electric control unit, one of the position detecting switches being switched off when the spur wheel is rotated in a direction which decreases the biasing force of the spiral spring by a predetermined amount and it being switched on when the spur wheel is rotated in a direction which increases the biasing force of the spiral spring by a predetermined amount, and the other of the position detecting switches being switched off when the spur wheel is rotated in the direction which increases the biasing force of the spiral spring by a predetermined amount and it being switched on when the spur wheel is rotated in a direction which decreases the biasing force of the spiral spring by a predetermined amount, whereby the rotational position of the outer end portion of the spiral spring is detected by the electric control unit.

16. A webbing retractor as set forth in claim 15, wherein the worm wheel is connected to the spur wheel through reduction gearing rotatably supported on the sheet, whereby a rotation of the worm wheel is subjected to reduction before being transmitted to the spur wheel.

17. A webbing retractor as set forth in claim 16, wherein the spur wheel is biased in a direction of the cam plate by a spring supported on the sheet coaxially relative to the spur wheel, whereby contact between the spur wheel and the cam plate is maintained.

* * * * *